(12) United States Patent
Üyünük et al.

(10) Patent No.: US 11,602,834 B2
(45) Date of Patent: Mar. 14, 2023

(54) SCISSOR LIFT SYSTEM AND PLUG-IN MOBILITY MECHANISM FOR WIND TURBINE BLADE ROTATING DEVICE

(71) Applicant: TPI Composites, Inc., Warren, RI (US)

(72) Inventors: Mehmet Üyünük, Izmir (TR); Furkan Ünal, Izmir (TR)

(73) Assignee: TPI Composites, Inc., Warren, RI (US)

( * ) Notice: Subject to any disclaimer, the term of this patent is extended or adjusted under 35 U.S.C. 154(b) by 348 days.

(21) Appl. No.: 16/373,289

(22) Filed: Apr. 2, 2019

(65) Prior Publication Data

US 2019/0299393 A1 Oct. 3, 2019

Related U.S. Application Data

(60) Provisional application No. 62/651,581, filed on Apr. 2, 2018, provisional application No. 62/651,588, filed
(Continued)

(51) Int. Cl.
*B25H 1/00* (2006.01)
*F03D 13/40* (2016.01)
(Continued)

(52) U.S. Cl.
CPC ............ *B25H 1/005* (2013.01); *B25B 1/205* (2013.01); *B60P 3/40* (2013.01); *F03D 13/40* (2016.05);
(Continued)

(58) Field of Classification Search
CPC . B25H 1/005; F03D 13/40; F03D 1/00; B60P 3/40; F16M 11/10; F16M 11/18;
(Continued)

(56) References Cited

U.S. PATENT DOCUMENTS 3,402,904 A * 9/1968 Paraskewik ............ F42B 39/22
410/44
3,430,981 A 3/1969 Tarantola
(Continued)

FOREIGN PATENT DOCUMENTS

CN 205336053 U 6/2016
CN 108423399 A 8/2018
(Continued)

OTHER PUBLICATIONS

Extended European Search Report for EP Application No. 19781550.9 dated Nov. 29, 2021.
(Continued)

*Primary Examiner* — Tan Le
(74) *Attorney, Agent, or Firm* — Stephen J. Kenny; Vincenzo DiMonaco; Foley Hoag LLP

(57) ABSTRACT

A wind turbine blade handling apparatus for rotating and lifting a blade. The apparatus includes a root device having a root support member with a concave upper surface and rollers having a longitudinal axis parallel to the longitudinal axis of the blade and configured to rotate the blade; a base, and a scissor-lift mechanism with intersecting struts which converts from a lowered position wherein the struts are disposed in a generally coplanar configuration, to an elevated position wherein the struts are disposed in an angled configuration.

19 Claims, 8 Drawing Sheets

Related U.S. Application Data on Apr. 2, 2018, provisional application No. 62/651,601, filed on Apr. 2, 2018, provisional application No. 62/651,586, filed on Apr. 2, 2018.

(51) Int. Cl.

| | | |
|---|---|---|
| *F16M 11/42* | (2006.01) | |
| *F16M 11/38* | (2006.01) | |
| *F16M 11/18* | (2006.01) | |
| *F16M 11/10* | (2006.01) | |
| *B60P 3/40* | (2006.01) | |
| *B25B 1/20* | (2006.01) | |
| *B62B 5/00* | (2006.01) | |

(52) U.S. Cl.
CPC ............ *F16M 11/10* (2013.01); *F16M 11/18* (2013.01); *F16M 11/38* (2013.01); *F16M 11/42* (2013.01); *B62B 5/003* (2013.01); *B62B 5/0033* (2013.01); *F05B 2240/941* (2013.01); *F05B 2260/02* (2013.01); *F05B 2260/30* (2013.01); *F16M 2200/022* (2013.01); *F16M 2200/028* (2013.01)

(58) Field of Classification Search
CPC .. F16M 11/38; F16M 11/42; F16M 2200/028; F16M 13/02; B62B 5/003; B62B 5/0033; F05B 2240/941; F05B 2260/02; F05B 2260/30; B23K 11/068; B23K 37/053; B23K 5/02; B23K 9/0325; A45C 15/00; B66F 7/065
See application file for complete search history.

(56) References Cited

U.S. PATENT DOCUMENTS

| | | | |
|---|---|---|---|
| 4,243,350 | A | 1/1981 | Hall |
| 5,251,893 | A | 10/1993 | Schoenhenz |
| 5,885,040 | A | 3/1999 | Parker |
| 7,303,365 | B2 | 12/2007 | Wobben |
| 7,670,090 | B1 | 3/2010 | Landrum et al. |
| 7,967,536 | B2 | 6/2011 | Broderick et al. |
| 8,313,272 | B2 | 11/2012 | Koike |
| 8,632,286 | B2 | 1/2014 | Wessel et al. |
| 8,708,625 | B1 | 4/2014 | Landrum et al. |
| 8,753,050 | B2 | 6/2014 | Cyrus et al. |
| 9,004,843 | B2 | 4/2015 | Lemos et al. |
| 9,347,426 | B2 | 5/2016 | Landrum et al. |
| 9,429,139 | B2 | 8/2016 | Johnson et al. |
| 9,638,162 | B1 | 5/2017 | Fletcher et al. |
| 9,945,351 | B2 | 4/2018 | Lulker et al. |
| 10,857,663 | B2 | 12/2020 | Uyunuk et al. |
| 11,027,412 | B2 | 6/2021 | Uyunuk et al. |
| 11,534,904 | B2 | 12/2022 | Üyünük et al. |
| 11,541,529 | B2 | 1/2023 | Üyünük et al. |
| 2005/0115775 | A1 | 6/2005 | Thomson et al. |
| 2006/0251517 | A1 | 11/2006 | Grabau |
| 2009/0020445 | A1 | 1/2009 | Koike |
| 2009/0169323 | A1 | 7/2009 | Livingston |
| 2011/0008147 | A1 | 1/2011 | Lemos et al. |
| 2011/0031292 | A1 | 2/2011 | Krogh et al. |
| 2011/0131785 | A1 | 6/2011 | Madsen |
| 2011/0142589 | A1* | 6/2011 | ten Thoren ............... B60P 3/40 414/800 |
| 2012/0124833 | A1 | 5/2012 | Arendt et al. |
| 2013/0104376 | A1 | 5/2013 | Pedersen |
| 2013/0119002 | A1 | 5/2013 | Frederiksen |
| 2013/0315685 | A1* | 11/2013 | Pedersen ................ F03D 13/40 410/44 |
| 2014/0103277 | A1 | 4/2014 | Cormack |
| 2014/0259669 | A1 | 9/2014 | Busbey et al. |
| 2014/0356113 | A1 | 12/2014 | Schmidt et al. |
| 2014/0361127 | A1 | 12/2014 | Van Der Zee |
| 2014/0369779 | A1* | 12/2014 | Randall .................... B60P 3/40 410/45 |
| 2015/0028610 | A1 | 1/2015 | Hansen et al. |
| 2015/0144761 | A1* | 5/2015 | Davi ...................... F16M 11/38 248/542 |
| 2015/0329036 | A1 | 11/2015 | Johnson et al. |
| 2015/0337799 | A1 | 11/2015 | Hansen et al. |
| 2016/0302545 | A1 | 10/2016 | Berger |
| 2018/0118538 | A1* | 5/2018 | Latvys ..................... B66F 7/28 |
| 2018/0223811 | A1 | 8/2018 | Fletcher et al. |
| 2019/0299393 | A1 | 10/2019 | Uyunuk et al. |
| 2021/0086345 | A1 | 3/2021 | Uyunuk et al. |
| 2021/0291350 | A1 | 9/2021 | Uyunuk et al. |

FOREIGN PATENT DOCUMENTS

| | | |
|---|---|---|
| EP | 2584191 A1 | 4/2013 |
| EP | 2708731 A2 | 3/2014 |
| EP | 3046803 A1 | 7/2016 |
| JP | 2010/216317 A | 9/2010 |
| JP | 2012/500150 A | 1/2012 |
| KR | 20090132080 A | 12/2009 |
| WO | WO-2012/048718 A1 | 4/2012 |
| WO | WO-2012/048719 A1 | 4/2012 |
| WO | WO-2019/195322 A1 | 10/2019 |

OTHER PUBLICATIONS

Extended European Search Report for EP Application No. 19781696 dated Jan. 11, 2022.
International Search Report and Written Opinion for International Application No. PCT/US2019/025425 dated Jun. 24, 2019.
International Search Report and Written Opinion for International Application No. PCT/US2019/025429 dated Jun. 24, 2019.
International Search Report and Written Opinion for International Application No. PCT/US2019/025432 dated Jun. 20, 2019.
Suppplementary European Search Report for EP Application No. 19780950 dated Dec. 15, 2021.
Suppplementary European Search Report for EP Application No. 19781091 dated Dec. 15, 2021.

\* cited by examiner

SCISSOR LIFT SYSTEM AND PLUG-IN MOBILITY MECHANISM FOR WIND TURBINE BLADE ROTATING DEVICE

CROSS-REFERENCE TO RELATED APPLICATIONS

This application claims the benefit under 35 USC 119 of priority to U.S. Provisional Application Nos. 62/651,588, 62/651,586, 62/651,581 and 62/651,601 filed Apr. 2, 2018, the entire contents of each are hereby incorporated by reference.

BACKGROUND OF THE DISCLOSED SUBJECT MATTER

Field of the Disclosed Subject Matter

The disclosed subject matter relates to a wind turbine rotor blade handling and scissor lift system, and a corresponding method of operating such a system.

Description of Related Art

A variety of methods and systems are known for use in the manufacturing process of wind turbine blades, including carts acting to support a section of the wind turbine blade, e.g. after removal from the blade mold, and during post molding operations (e.g. external blade surface grinding or coating operations).

Conventional blade carts comprise an enclosed ring structure which is fitted around the body of the blade. However, as blade dimensions increase, these carts are often difficult to mount to the blade. Often times a crane is required to support the blade weight while the cart is moved (often manually) along the blade. In addition, the cart presents a hazard during post molding operations where people and equipment are hindered by the large ring, and prevented from easily accessing the blade leading and trailing edges at the location of the cart.

Conventional blade carts are configured with closed brackets forming a closed ring into which the wind turbine blade is introduced. The drawback of this configuration lies in the operation of loading the blade into the cart since to perform the loading step either the cart must be moved from the tip of the blade to the position of the blade where the cart can support the blade weight, or the blade must be moved into the cart by means of using an overhead travelling crane and cables. In addition to the undesirable complexity of such conventional blade handling systems, operation of these conventional systems require a variety of movements which present high risk of blade damage when introducing and removing the various components.

Some exemplary conventional blade handling systems are disclosed in WO 2013092597, WO 2012048719, US 20140356113, EP 2584191, JP2010216317, each of which is hereby incorporated by reference it its entirety, including the particular blade contacting elements and relative range of motions disclosed.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a wind turbine blade apparatus comprising: a root device, the root device including: a root support member, the root support member having an upper surface with a radius of curvature and configured to receive a portion of a wind turbine blade, at least one roller, the roller having a longitudinal axis parallel to the longitudinal axis of the blade and configured to rotate the blade; a base, and a lift mechanism disposed below the root support member, the lift mechanism at least partially disposed within the base and configured to adjust the height of the root support member.

In some embodiments, the lift mechanism includes a scissor lift having a plurality of struts, wherein at least two struts are connected at respective midpoints thereof, and the struts are pivotably connected to the base and transition from a first horizontal position to a second angled position.

In some embodiments, the second angled position is approximately 45 degrees.

In some embodiments, the scissor lift is actuated via telescoping pistons

In some embodiments, at least one piston has a first end attached to a frame and a second end attached to a strut.

In some embodiments, the lift mechanism includes a locking feature to secure the root support member at a predetermined height.

In some embodiments, the lift mechanism changes elevation of the root support member simultaneously with the rotation of the blade.

In some embodiments, at least one roller is configured as a conveyor belt.

In accordance with another aspect of the disclosure, a wind turbine blade apparatus is disclosed comprising: a root device, the root device including: a root support member, the root support member having an upper surface with a radius of curvature and configured to receive a portion of a wind turbine blade, at least one roller, the roller having a longitudinal axis parallel to the longitudinal axis of the blade and configured to rotate the blade, a base; and a lift mechanism having at least one pair of intersecting struts, the lift mechanism having a first position wherein the struts are disposed in a generally coplanar configuration, and a second position wherein the struts are disposed in an angled configuration.

In some embodiments, the lift mechanism is housed within the base when in the first position.

In some embodiments, the lift mechanism includes a frame, the frame surrounding the struts.

In some embodiments, the lift mechanism further comprises at least one actuator (e.g. pneumatic, hydraulic, mechanical, piezoelectric, etc.) having a first and second end, the first end attached to the frame and second end attached to a strut.

In some embodiments, the lift mechanism is programmed to prevent the lift mechanism from operating when the root support member engages a blade.

In some embodiments, the root device includes a removable mobility system.

In some embodiments, the removable mobility system includes a mounting plate and casters.

In some embodiments, the mounting plate is removably attached to the base.

In some embodiments, the root device includes a propulsion mechanism for rotating the wind turbine blade.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

DETAILED DESCRIPTION OF AN EXEMPLARY EMBODIMENT

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

Reference will now be made in detail to exemplary embodiments of the disclosed subject matter, an example of which is illustrated in the accompanying drawings. The method and corresponding steps of the disclosed subject matter will be described in conjunction with the detailed description of the system.

The methods and systems presented herein may be used for handling, e.g. clamping, securing, rotating and transporting a wind turbine blade. The system and apparatus disclosed herein can be used to facilitate various finishing processes of the wind turbine blade manufacturing. In an exemplary embodiment, this system consists of two separate apparatus called "Root Device" and "Tip device" as shown within the figures included herein.

Figure 1:
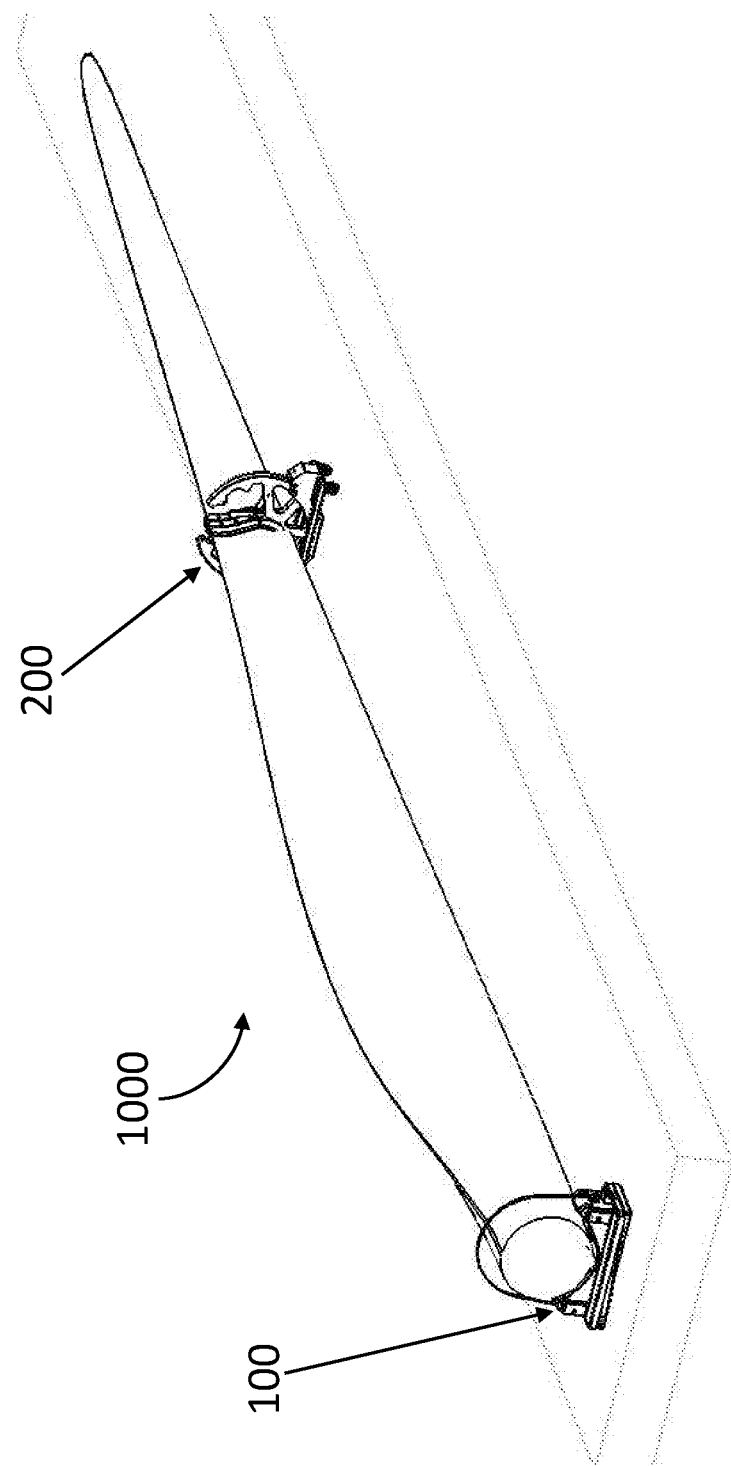
FIG. 1 is a schematic representation of a wind turbine blade mounted to the handling system disclosed herein.
Figure 2:
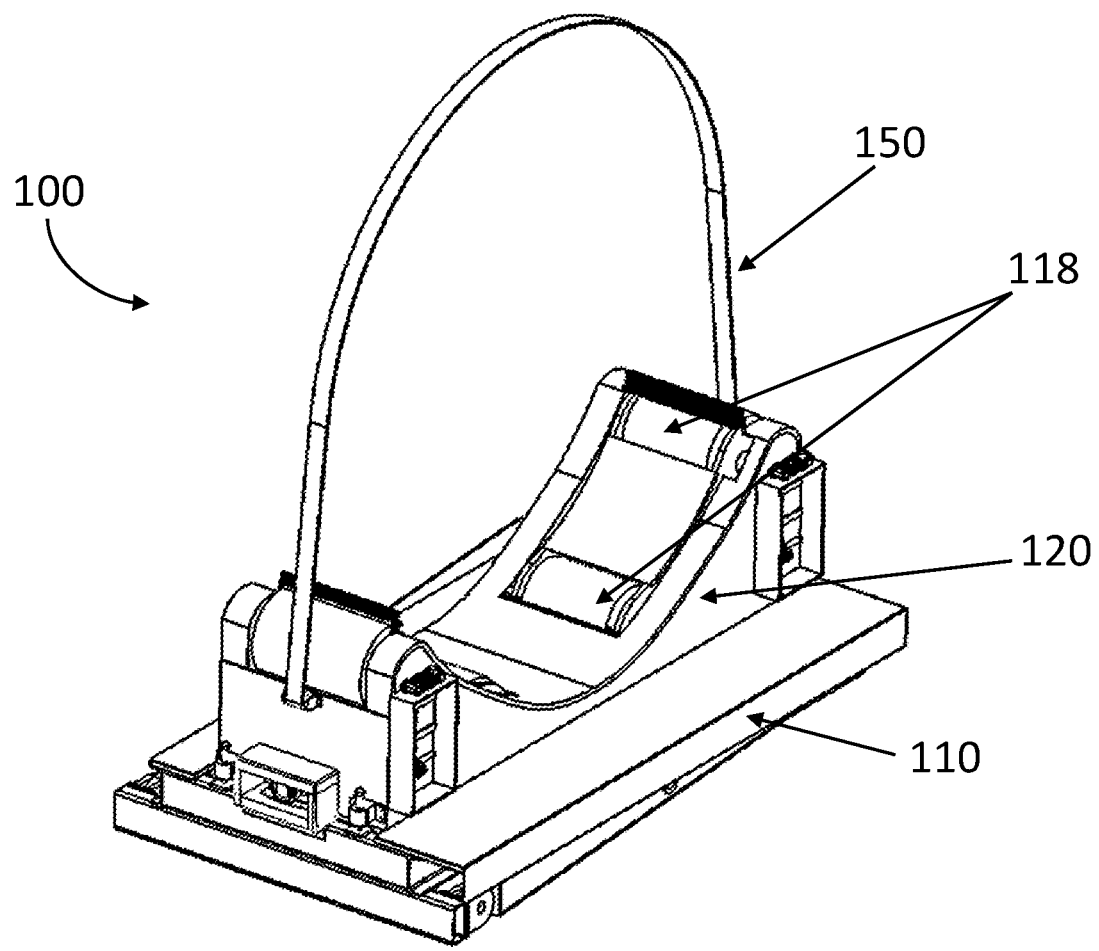
FIG. 2 is a schematic representation of the root device of the handling system disclosed herein.

As shown in FIG. 1, the system 1000 generally includes a Root Device (100) and a Tip Device (200). These subsystems 100, 200 provide additional handling functions and the ability to handle larger wind turbine blades with higher efficiency, accessibility and ergonomics than conventional handling systems.

Self-Aligned Tilt & Yaw System—Root Device (100)

The Root Device (100) includes a base (110) and a root support member (120), as shown in FIGS. 1-5. The root support member (120) can be a single, integral unit, or can be comprised of a plurality of discrete units which can be joined together or otherwise connected to receive and support a wind turbine blade.

The Root Device (100) is adapted to receive the root portion of the wind turbine blade, and to rotate the blade (at various speeds). Accordingly, the root support member (120) is configured with a complimentary shape to the wind turbine root, e.g. arcuate. The root support member (120) can comprise a curved shape with a radius which is similar to the outer radius of the root portion. In more general terms, the shape of the root supporting member is adapted to the shape of the root portion. In some embodiments the root support member 120 can be adjustable to accommodate varying root geometries.

The power to generate the movement (e.g. rotation about the blade longitudinal axis) of the wind turbine blade can be provided in a variety of ways, e.g. electric motor, pneumatic or hydraulic systems. In some embodiments, the power means (and associated wiring, cables or piping, as the case may be) are housed directly within the Root Device. In other embodiments, the power source, and/or auxiliary power systems, can be located external to the Root Device (100) housing.

The Root Device also includes rollers (118) for engaging the blade and facilitating rotation of the blade along the blade longitudinal axis. In some embodiments, the rollers (118) can be configured to extend or protrude outwardly from the root support member (120), when in the empty or unloaded configuration (i.e. when no blade is present on the Root Device). These rollers (118) can then be depressed or sunk, independently of each other, once a blade is deposited onto the Root Device, thereby engaging the roller (118). This relative movement or displacement of the rollers can be a linear trajectory in some embodiments (e.g. vertically up/down). In other embodiments, the rollers (118) may be pivoted relative to the root support member (120). In some embodiments, the rollers 118 are rigidly mounted to the root support member (120) with the only permissible motion being rotation about their central axes. The roller engages, and facilitates rotation, with the root portion of the blade by surface friction. Accordingly, when the power driving means are applied to the rollers (118) each roller begins to rotate, which in turn, causes the blade to rotate.

The dimensions of the rollers are configured to correlate with a dimensions of the blade, e.g. when handling a heavy/long rotor blade a larger/longer roller is used than for handling a lighter/short rotor blade. However, the length of the rollers may correlate with a specific design, e.g. having an eccentric shape, of the rotor blade and/or maintaining a desired surface pressure between the rollers and the rotor blade. Employing flexible rollers which can adjust in positioning is advantageous in that it allows the system to adapt to blades of different radii and/or shapes.

In some embodiments, the rollers (118) can be configured as conveyor belts with a strap of gripping material wrapped around adjacent rollers. In such embodiments, the surface area in contact with the blade is thus increased compared to the discrete roller configuration. Also, each of the conveyor belts can cling to the blade independently of the other conveyor belts. As a result, in each case a high contact surface is achieved even with components having different diameters, via which each of the conveyor belts rests against the component in a force-locking manner. As a result, the turning device ensures reliable holding of the component even with different component diameters. In some embodiments, the spacing between rollers (118) is adjustable, and the total number of rollers (118) employed can be greater or less the four depicted in the exemplary embodiment shown.

Figure 3:
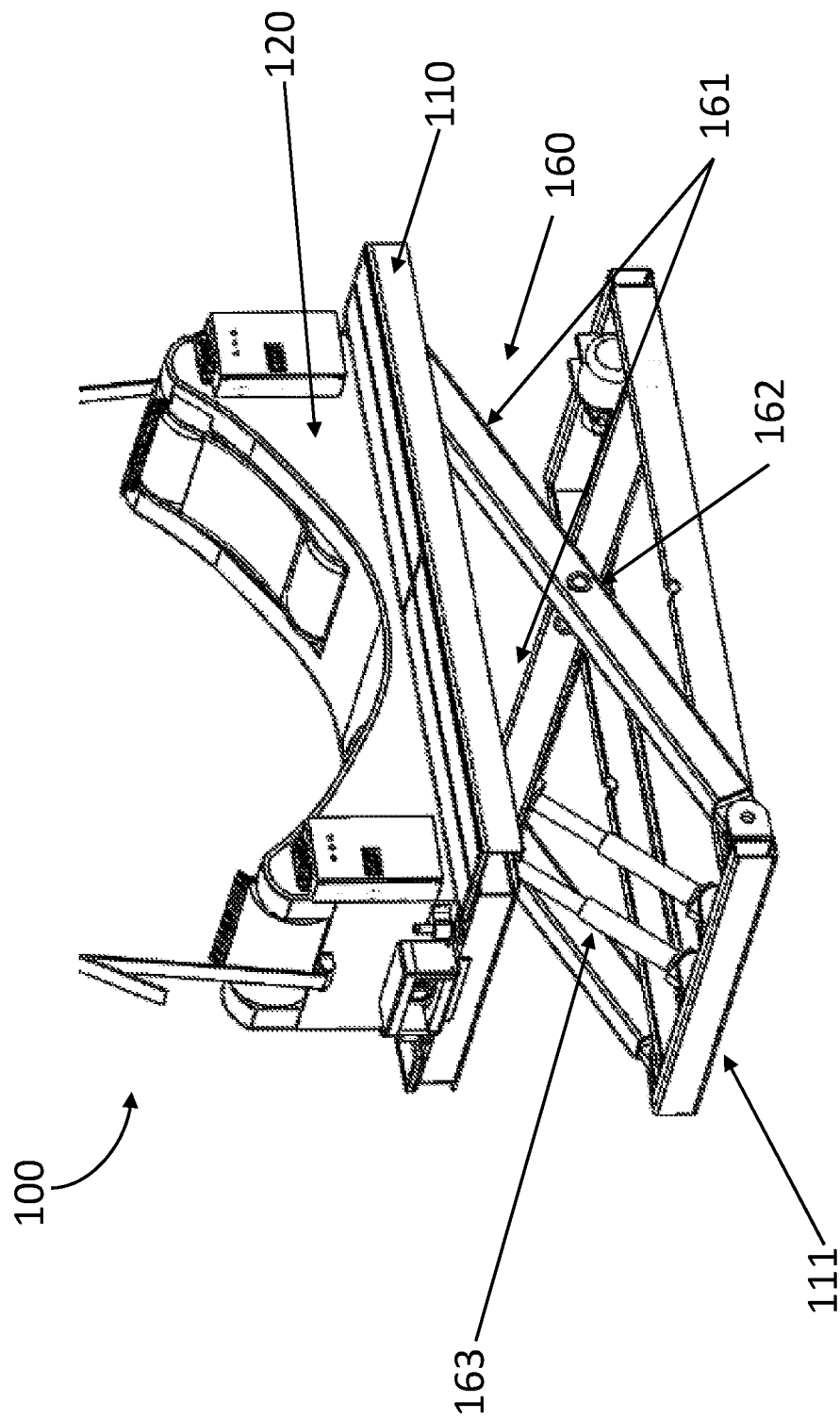
FIG. 3 is a perspective view of the root device and scissor lift system disclosed herein, shown in a partially extended/elevated position.
Figure 4:
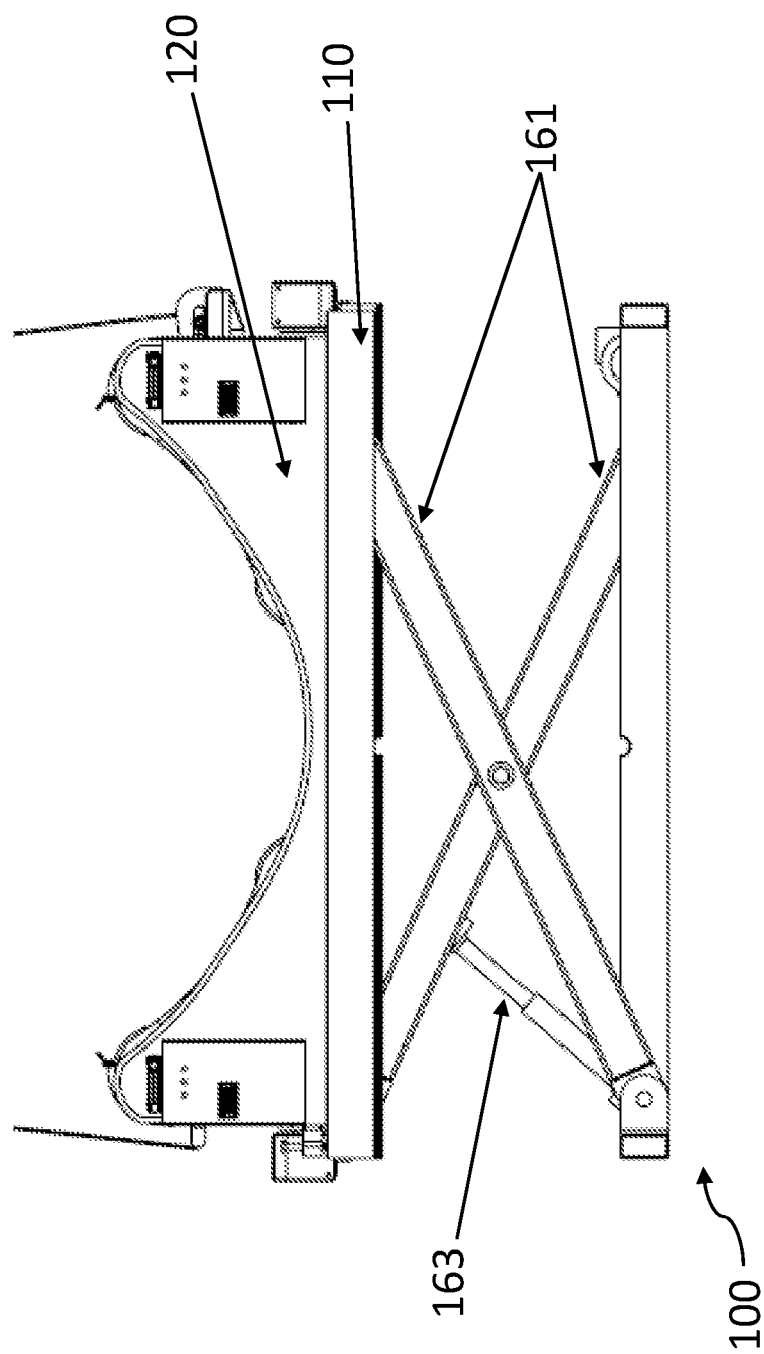
FIG. 4 is a front view of the root device and scissor lift system disclosed herein, shown in a partially extended/elevated position.
Figure 5:
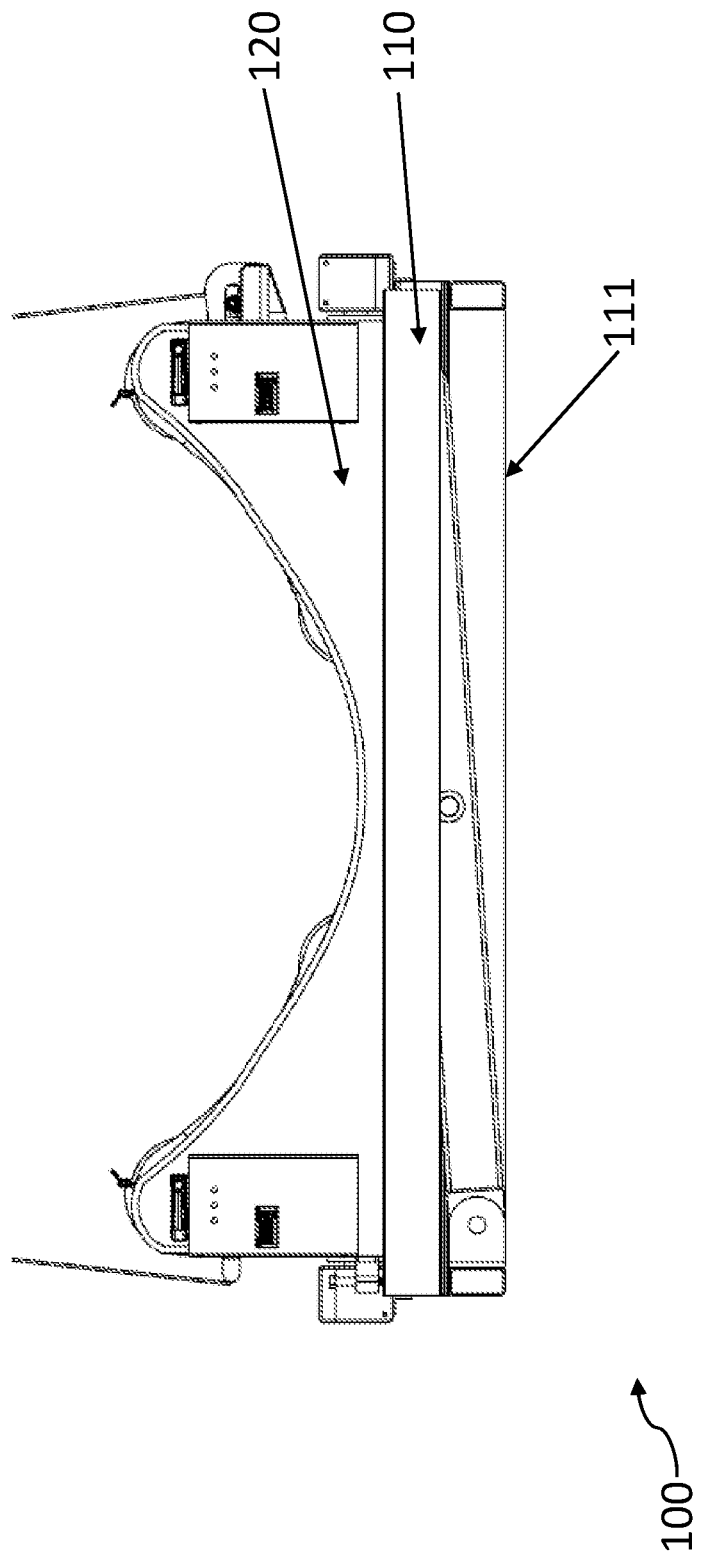
FIG. 5 is a front view of the root device and scissor lift system disclosed herein, shown in a collapsed/closed position.

In accordance with an aspect of the disclosure, the Root Device (100) includes a lift system (160) which can control the height of the Root Device. In the exemplary embodiment shown, the lift system (160) is configured as a scissor lift system including crisscrossed struts (161) that are connected at the midpoint (162), e.g. via a pivot/hinge. The struts (161) are connected to the base (110) and lateral sides of frame (111) via hinges or bearings which allow for each strut (161) to pivot from a first horizontal position, to an extended position, as shown in FIG. 3. The maximum height of the extended position can vary as desired. In the exemplary embodiment shown, the struts (161) are rotated to an angle of approximately 45 degrees with respect to the horizontal base (110) to reach the extended position. Also, in the exemplary embodiment, when in the horizontal position shown in FIG. 2, the struts (161) are configured to be positioned underneath the base (110) of the Root Device (100). Thus, when in the collapsed or lowered configuration, the entire scissor lift system is covered by or housed within the base (110).

The scissor lift system (160) of the present disclosure can be actuated via telescoping pistons (163), which have a first end attached to the frame (111) and a second end attached to the struts (161). These pistons can be powered by the same mechanism as the rollers (118), or be configured with an independent power source. In the exemplary embodiment, a pair of telescoping pistons (163) are depicted on the left side of the Root Device (100), though additional pistons can be employed and/or relocated to the right side, if so desired. The power source(s) can be located above the base (110) and within the root support member (120).

Figure 7:
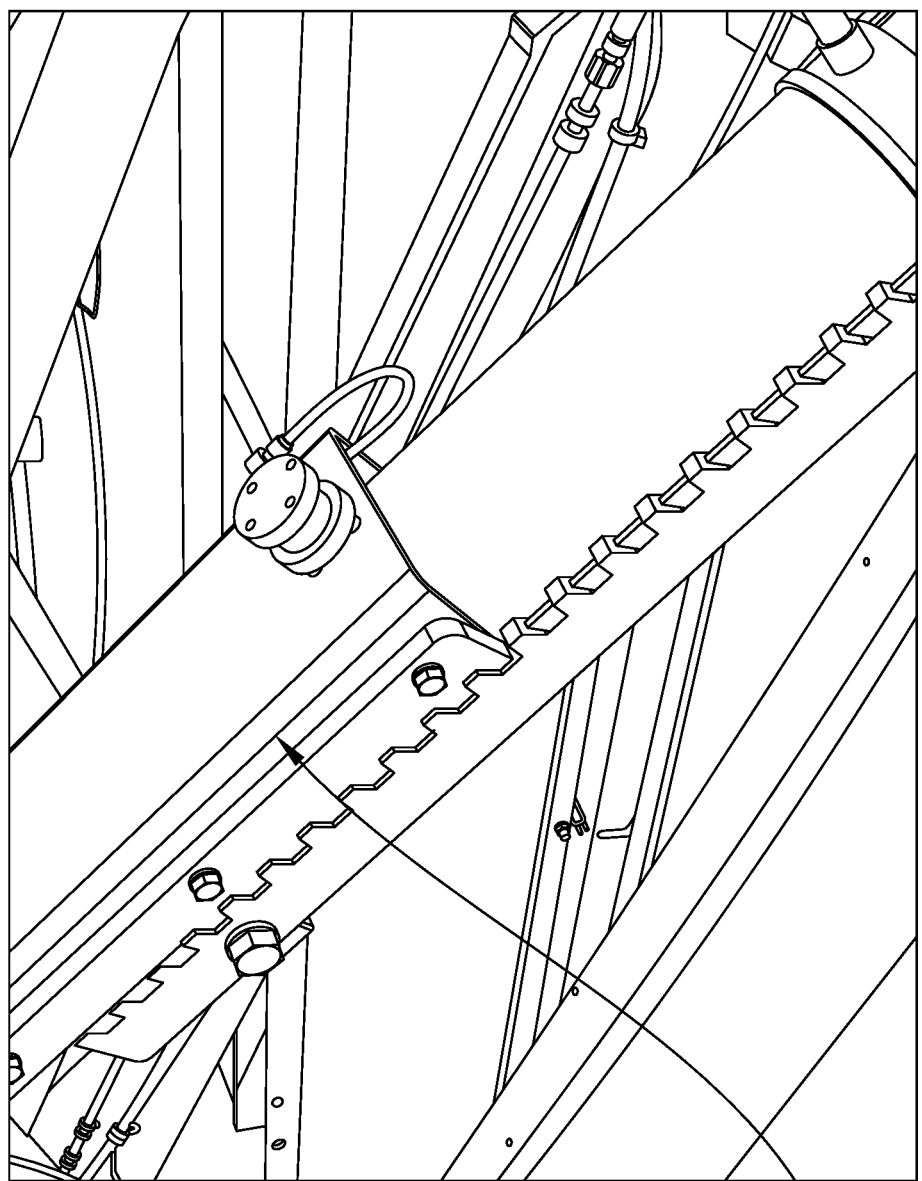
FIG. 7 is an isolated view of the extension/locking feature of the root device and scissor lift system disclosed herein.

The scissor lift system (160) can also include a positioning and/or locking feature to safely secure the Root Device (100) at a chosen height. The locking feature can be sized and scaled to support the Root Device weight plus the blade root (if present). Also, the locking feature and scissor lift can be operated manually, or via a programmable control system to automatically adjust the Root Device height in accordance with a timed schedule and/or based on location within a shop floor (e.g. height positioning of specific blade during rotation of the blade to access blade surface). An exemplary locking feature (165) is shown in FIG. 7, which is configured as a mechanical lock on the telescoping piston that includes a pin extending into the piston to prevent the fall/collapse of the piston (even in the event of hydraulic/pneumatic failure). In the exemplary embodiment depicted, the locking feature can include upper and lower tracks, each having a series of interlocking teeth which matingly engage to prohibit relative movement therebetween. To release, the upper track can be pushed away from the lower track, to disengage the teeth, and thereby permit the upper and lower tracks move or slide relative each other (as the scissor lift assembly rises or falls) to a desired position in which the teeth can be reengaged to again lock the assembly together.

Additionally, sensors can be employed at various locations to measure the rotational speed, and any accelerations or vibrations, of the wind turbine blade within the Root Device (100) as well as the position, e.g. height, of the Root Device (100). In some embodiments, sensors can be configured as wheeled encoders are positioned between the rollers to engage the blade and measure rotational speed and acceleration of the blade. Additionally or alternatively, sensors located on the base (110) or root support member (120) can detect the height of the Root Device (100), e.g. distance from the frame (111) and/or floor, and signal the PLC software control algorithm to actuate the power source to achieve the desired height. After this desired height is achieved, the sensors can signal to the locking feature to engage and maintain the Root Device (100) and the fixed height. Additionally or alternatively, sensors can be embedded within the struts (163) to detect Root Device height based on parameters within the struts (e.g. pressure, if the struts employ hydraulic or pneumatic systems).

In accordance with an aspect of the present disclosure, the scissor system of the Root Device (100) allows for greater blade surface accessibility. In some embodiments, the scissor system (160) can operate, e.g. ascend/descend, simultaneously with the rotation of the blade via rollers (118). In other embodiments, the PLC control software will prevent scissor system (160) from operating when: i) the root support member is loaded with a blade; and/or ii) when the rollers (118) are spinning to rotate a blade.

The scissor system (160) of the present disclosure can be configured as separate system from the propulsion system which rotates the turbine blade (via rollers 118). These two systems can operate independently of each other, either in a simultaneous fashion, or in serial with one system terminating prior to initiation of the other system.

Also, the scissor system disclosed herein enhances the safety of personnel within the proximity of the blade. Furthermore, the present disclosure reduces the risk of damage to the wind turbine blade as warping or bending loads on the turbine blade, due to gravitational force acting between the points of blade support at the Root and Tip devices, can be reduced or eliminated based on the adjustable height of the root, as provided by the scissor system disclosed herein.

The Root Device (100) operates in concert with the Tip Device, described in further detail below. Thus, in accordance with an aspect of the present disclosure, during operation, the blade rotational force is generated within the Root Device (100) and the scissor lifting force is likewise generated (independently, simultaneously, or in series from the rotational force) in the Root Device (100).

Figure 6:
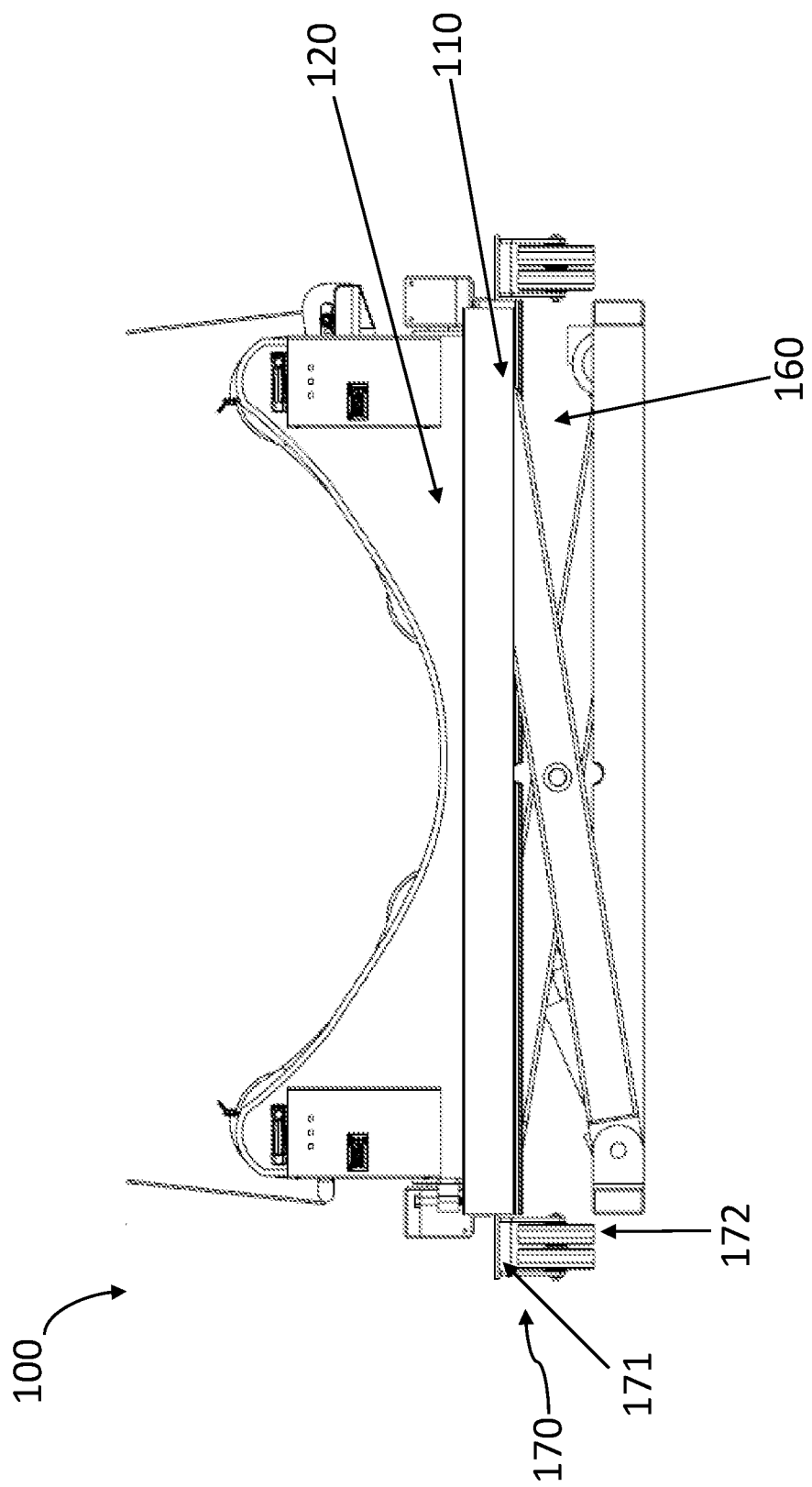
FIG. 6 is a front view of the root device and scissor lift system disclosed herein, shown in a collapsed/closed position and including removable casters.

In accordance with another aspect of the disclosure, the Root Device (100) can be outfitted with removable mobility system. In the exemplary embodiment shown in FIG. 6, the removable mobility feature is configured as a mounting plate (171) and casters (172). The casters can be permitted to swivel in 360 degrees, or alternatively be configured with a restricted range of motion. The mounting plate (171) can be releasably attached to the base (110) via coupling mechanism, e.g. locking pin, which can be inserted either laterally through the side of the base (110) or underneath the base, as so desired. In some embodiments, the scissor lift system (160) can be actuated to raise the Root Device (100), thereafter the mobility system can be attached to the Root Device (100). Similarly, once the Root Device is in the desired location, the mobility system (170) can be actuated to lower the Root Device (100), thereafter the mobility system can be removed from the Root Device (100).

The removable aspect of the mobility system (170) is advantageous in that it provides a modular system that increases the flexibility of the manufacturing process and shop floor layout. Accordingly, a single mobility system (170) can be employed on a variety of Root Devices. Furthermore, the modular nature of the mobility system allows for a single system (170) to accommodate a range of Root Device sizes and shapes.

Figure 8:
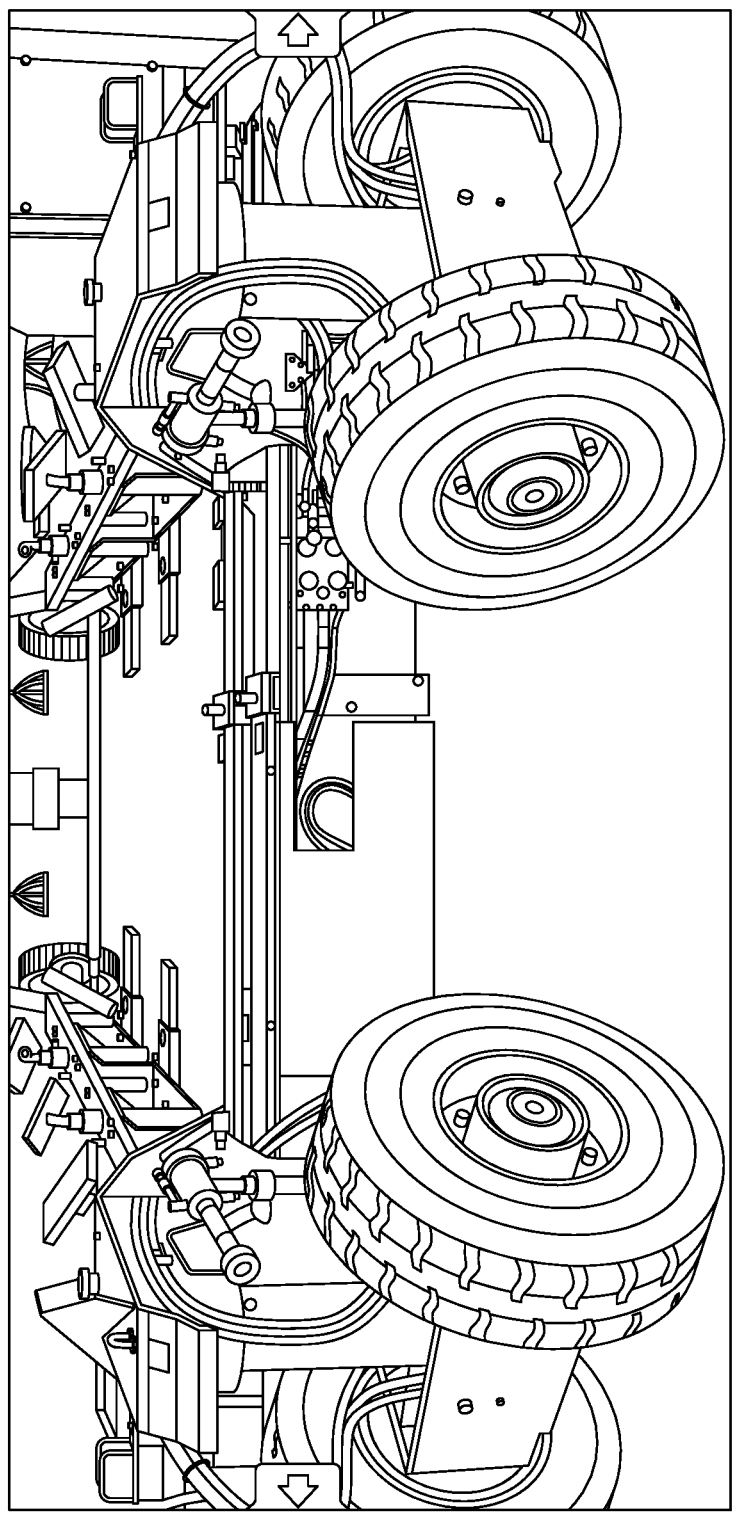
FIG. 8 is a view of a mobile apparatus for use with the root device and scissor lift system disclosed herein.

In some embodiments, this mobility system can be self-propelled to transport the Root Device (100) (including the blade, if present) throughout the shop floor. The power supply (e.g. diesel engine or rechargeable battery) for this mobility system can be the same source as the blade rollers (118) and/or scissor lift system, as described above. Alternatively, the power supply for the mobility system can be independent from the other power supplies. In some embodiments, instead of simple casters, electrical driven wheels could be employed and controlled by separate remote control unit, as shown in FIG. 8. The mobility system can be programmed with coordinates of various stations along the shop floor, with the mobility system self-propelling the Root Device (100) to those select locations. Additionally or alternatively, the mobility system can include sensors (e.g. cameras) to monitor the positioning of the Root Device (100) during transport to read predetermined markers along the shop floor and stop the Root Device upon reaching a desired location. For embodiments which are not self-propelled, the mounting plate can be engaged by a vehicle to transport the Root Device (100) about the shop floor.

Accordingly, the Root Device (100) with the scissor lift and mobility systems disclosed herein provides a variety of advantages including: allowing larger blade oration angles and surface accessibility; stable lifting with one or two actuating cylinders; lower structural height with scissor lift system; lesser working platform (scaffold) usage; mobility mechanisms do not raise device during blade rotation operation; integrated lifting and mobility features (that can operate independently and/or simultaneously); reduced costs as single mobility system can be employed on numerous root devices; self-propelled device provides more flexible transport means.

Tip Device (200)

In accordance with another aspect of the present disclosure, the Root Device (100 and Tip Device (200) can be arranged as separate and independently operable components. In an exemplary embodiment, blade rotation is driving by Root device (100) while tip device (200) is a passive device with no drive unit for rotation, e.g. is self-synchronizing via rotation of the blade itself. In some embodiments the Root Device and Tip Device can include position indicating mechanisms which convey the relative position of one component with respect to another. For example, an optical, e.g. laser, mechanism can be included which alerts the user when the Root Device and Tip Device are properly aligned (e.g. with respect to the blade longitudinal axis). If the Tip Device were accidentally displaced, an alarm can notify the user to take corrective action to bring the Tip Device back into alignment so as to not induce any undesired loads on the blade, or support apparatus. Preferably, the system disclosed herein is synchronized with the Root Device and Tip Device coordinated to move, e.g. rotate, at the same time and at the same speeds. Moreover, the Root Device and Tip Device can be configured to restrict relative movement therebetween, such that each apparatus moves in concert with the other (e.g. relocated along a shop floor) without imparting any loads on the blade disposed therein.

Additionally, the Tip Device (200) can be configured with a complimentary scissor lift system to maintain the tip of the blade in a horizontal orientation when the scissor system (160) of the Root Device (100) is operated to ascend/descend. Accordingly, a self-aligning tile and yaw system is provided at both root and tip device to give freedom of ±4 degrees for both axis to avoid inducing stress on the blade.

It will be understood that once the blade is supported within the Root Device and Tip Device any external support means, e.g. a harness, a crane, etc., for the blade can be removed. In some embodiments, the portions of the apparatus which engage the blade can include a protective cover to prevent damage and further absorb or cushion against undesired load transfer. Embodiments of the wind turbine blade handling system as described above may be flexible and can adapt to various rotor blade positions. This can result in smaller loads on the rotor blade. As a consequence, the risk of damages to the rotor blade is reduced.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A wind turbine blade apparatus comprising:
a root device, the root device including:
    a root support member, the root support member having an upper surface with a radius of curvature and configured to receive a portion of a wind turbine blade,
    at least one roller, the roller having a longitudinal axis parallel to the longitudinal axis of the blade and configured to rotate the blade, the at least one roller displaced from a first position extending outwardly from the root support member when no blade is present, to a second depressed position when a blade is positioned on the root device;
    a base,
    a lift mechanism disposed below the root support member, the lift mechanism at least partially disposed within the base and configured to adjust the height of the root support member; and
a tip device, the tip device configured to receive a portion of the blade tip, the tip device rotating at the same speed as at least one roller of the root device;

wherein a position indicating mechanism conveys the relative position of the root device and tip device to detect if the root device or tip device are aligned with respect to a longitudinal axis of the blade.

2. The wind turbine blade apparatus of claim 1, wherein the lift mechanism includes a scissor lift having a plurality of struts.

3. The wind turbine blade apparatus of claim 2, wherein at least two struts are connected at respective midpoints thereof.

4. The wind turbine blade apparatus of claim 2, wherein the struts are pivotably connected to the base and transition from a first horizontal position to a second angled position.

5. The wind turbine blade apparatus of claim 4, wherein the second angled position is approximately 45 degrees.

6. The wind turbine blade apparatus of claim 1, wherein scissor lift is actuated via telescoping pistons.

7. The wind turbine blade apparatus of claim 1, wherein at least one piston has a first end attached to a frame and a second end attached to a strut.

8. The wind turbine blade apparatus of claim 1, wherein the lift mechanism includes a locking feature to secure the root support member at a predetermined height.

9. The wind turbine blade apparatus of claim 1, wherein the lift mechanism changes elevation of the root support member simultaneously with the rotation of the blade.

10. The wind turbine blade apparatus of claim 1, wherein at least one roller is configured as a conveyor belt.

11. A wind turbine blade apparatus comprising:
   a root device, the root device including:
      a root support member, the root support member having an upper surface with a radius of curvature and configured to receive a portion of a wind turbine blade,
      at least one roller, the roller having a longitudinal axis parallel to the longitudinal axis of the blade and configured to rotate the blade;
   a base,
   a lift mechanism having at least one pair of intersecting struts, the lift mechanism having a first position wherein the struts are disposed in a generally coplanar configuration, and a second position wherein the struts are disposed in an angled configuration; and
   wherein the lift mechanism is programmed to prevent the lift mechanism from operating when the root support member engages a blade.

12. The wind turbine blade apparatus of claim 11, wherein the lift mechanism is housed within the base when in the first position.

13. The wind turbine blade apparatus of claim 11, wherein the lift mechanism includes a frame, the frame surrounding the struts.

14. The wind turbine blade apparatus of claim 13, further comprising at least one actuator having a first and second end, the first end attached to the frame and second end attached to a strut.

15. The wind turbine blade apparatus of claim 14, wherein the actuator is a pneumatic actuator.

16. The wind turbine blade apparatus of claim 11, wherein the root device includes a removable mobility system.

17. The wind turbine blade apparatus of claim 16, wherein the removable mobility system includes a mounting plate and casters.

18. The wind turbine blade apparatus of claim 17, wherein the mounting plate is removably attached to the base.

19. The wind turbine blade apparatus of claim 11, wherein the root device includes a propulsion mechanism for rotating the wind turbine blade.

* * * * *